Dec. 22, 1925. Re. 16,234
G. A. TAYLOR
DISPLAY RACK
Original Filed April 27, 1921 4 Sheets-Sheet 1
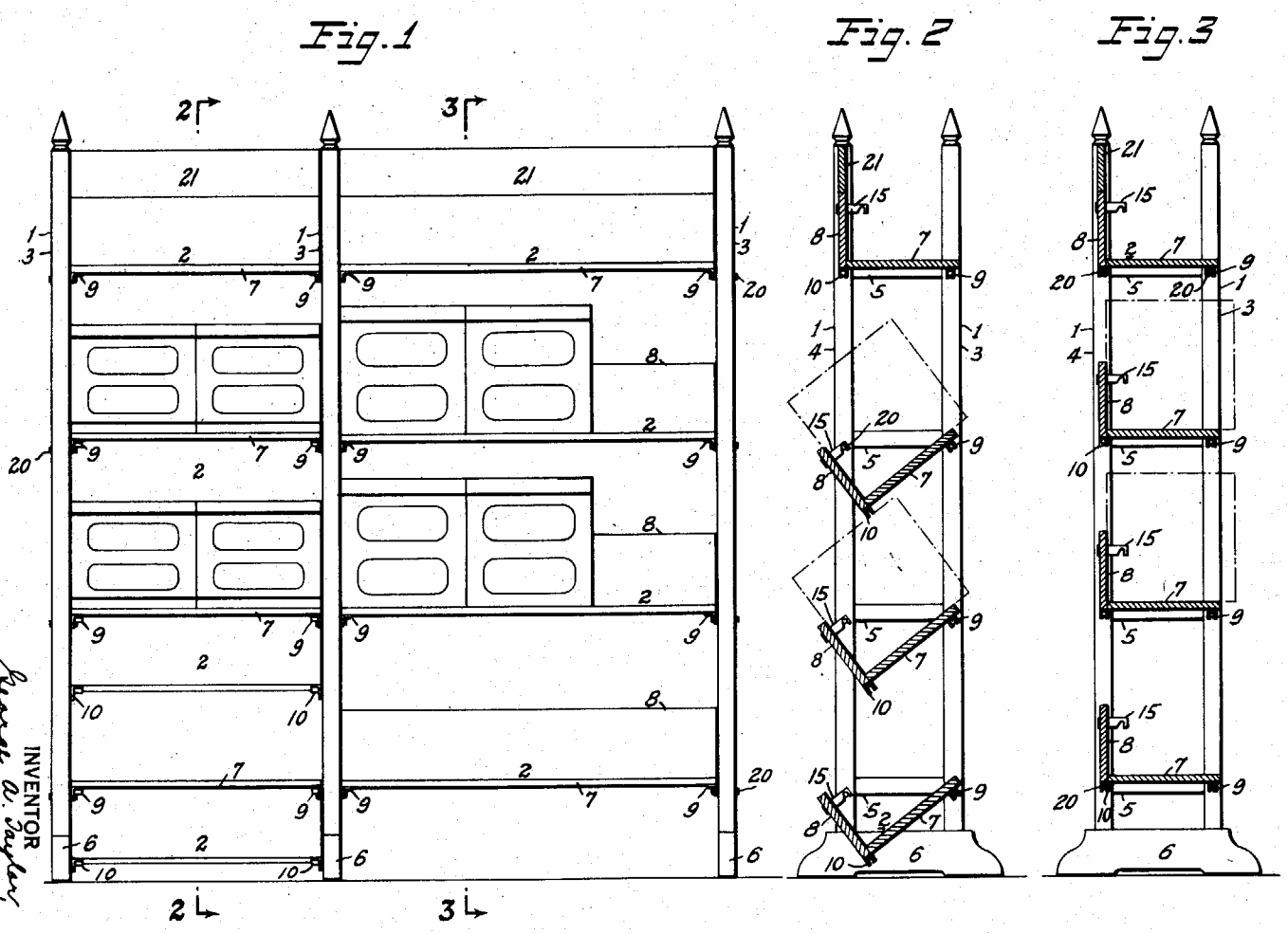
INVENTOR
George A. Taylor,
BY
Duell, Warfield & Duell
ATTORNEY Dec. 22, 1925. Re. 16,234

G. A. TAYLOR

DISPLAY RACK

Original Filed April 27, 1921 4 Sheets-Sheet 2

INVENTOR
George A. Taylor,
BY
Duell, Warfield & Duell
ATTORNEY

Dec. 22, 1925. Re. 16,234

G. A. TAYLOR

DISPLAY RACK

Original Filed April 27, 1921 4 Sheets-Sheet 3

INVENTOR
George A. Taylor,
BY
Dunn, Warfield & Dunn
ATTORNEY

Dec. 22, 1925. Re. 16,234

G. A. TAYLOR

DISPLAY RACK

Original Filed April 27, 1921 4 Sheets-Sheet 4

INVENTOR
George A. Taylor,
BY
Duell, Warfield & Duell
ATTORNEY

Reissued Dec. 22, 1925. Re. 16,234

UNITED STATES PATENT OFFICE.

GEORGE A. TAYLOR, OF BERGENFIELD, NEW JERSEY, ASSIGNOR TO NATIONAL BISCUIT COMPANY, OF NEW YORK, N. Y., A CORPORATION OF NEW JERSEY.

DISPLAY RACK.

Original No. 1,423,585, dated July 25, 1922, Serial No. 464,894, filed April 27, 1921. Application for reissue filed May 13, 1924. Serial No. 713,070.

*To all whom it may concern:*

Be it known that I, GEORGE A. TAYLOR, a citizen of the United States, and resident of Bergenfield, in the county of Bergen and State of New Jersey, have invented certain new and useful Improvements in Display Racks, of which the following is a specification.

This invention relates to display racks particularly adapted for the display of cartons or cans containing crackers or the like.

An object of this invention is to provide a rack of simple and inexpensive construction, which may be conveniently shipped in a knock-down condition, and which may be easily assembled and taken apart, and when assembled will be well braced and rigid.

A further object is to provide a rack which may be readily extended to any desired length by the incorporation in it of additional units.

A still further object is that of providing a rack capable of having its shelves disposed in either horizontal or rearwardly inclined positions according to the type of article which is to be supported and the manner in which the same is to be displayed.

Other objects of the invention will be in part obvious, and will in part appear hereinafter.

The invention accordingly comprises an article of manufacture possessing the features, properties, and the relation of elements which will be exemplified in the article hereinafter described and the scope of the application of which will be indicated in the claims.

Figure 5:
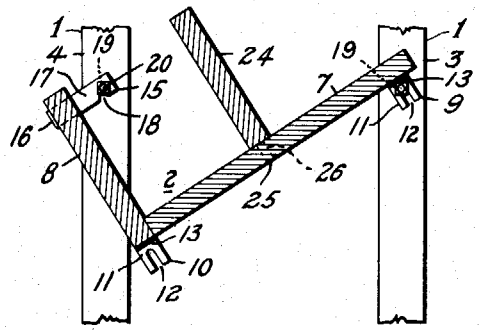
Figure 6:
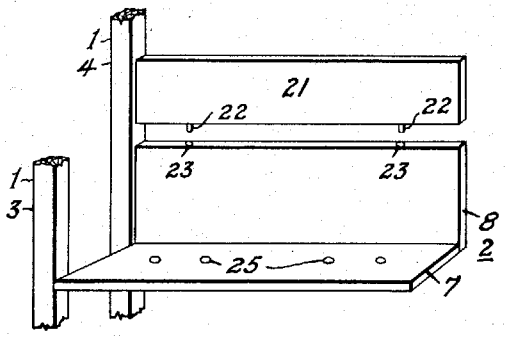
Figure 4:
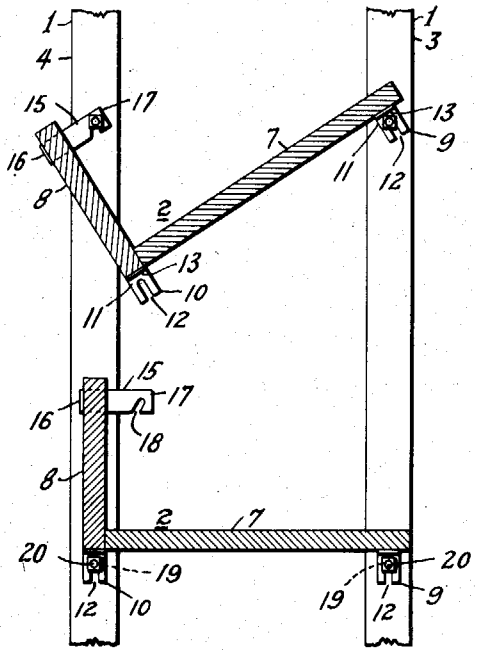
Figure 8:
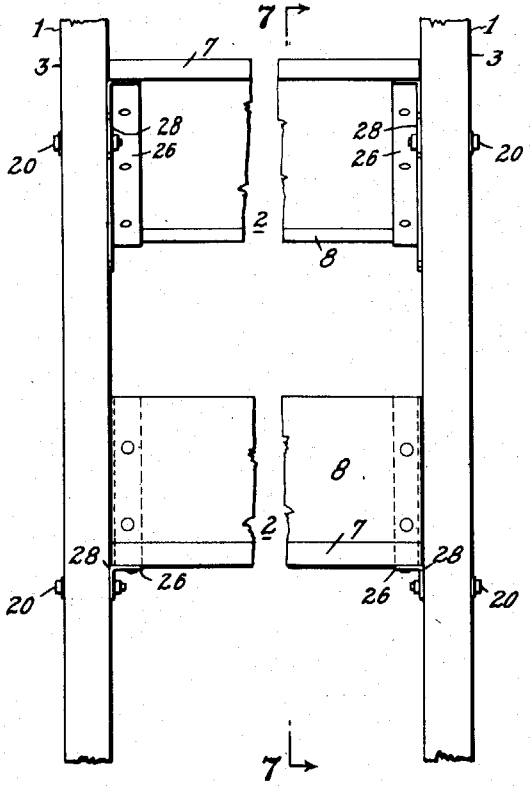
Figure 7:
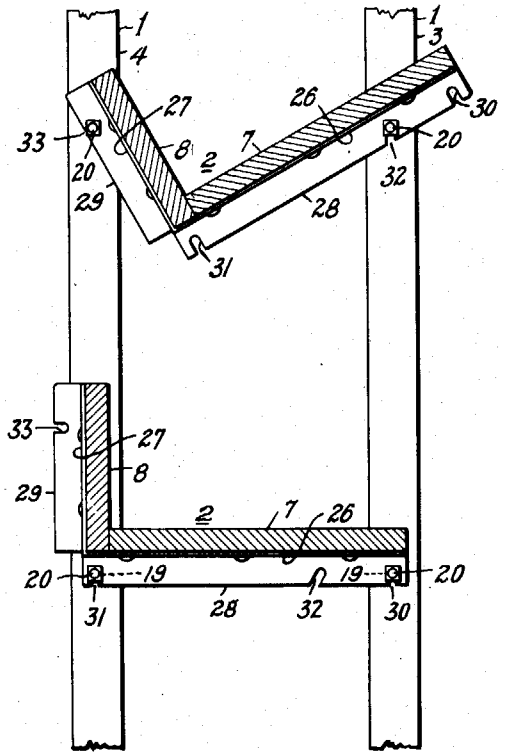
Figure 10:
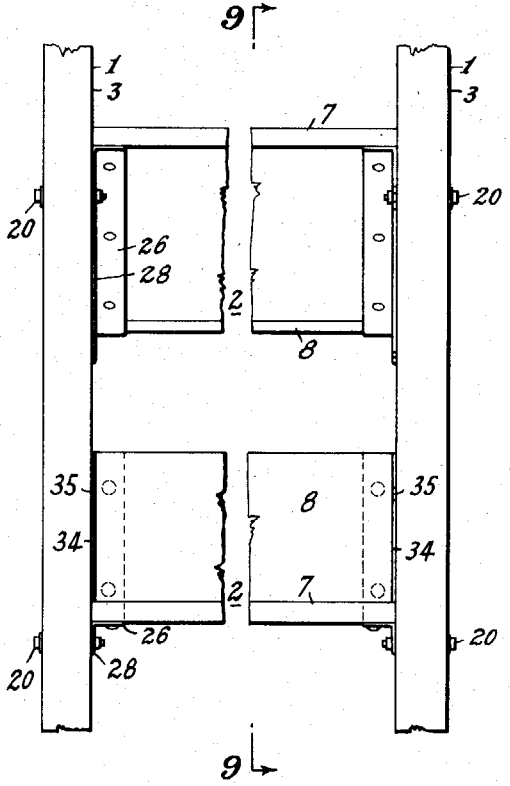
Figure 9:
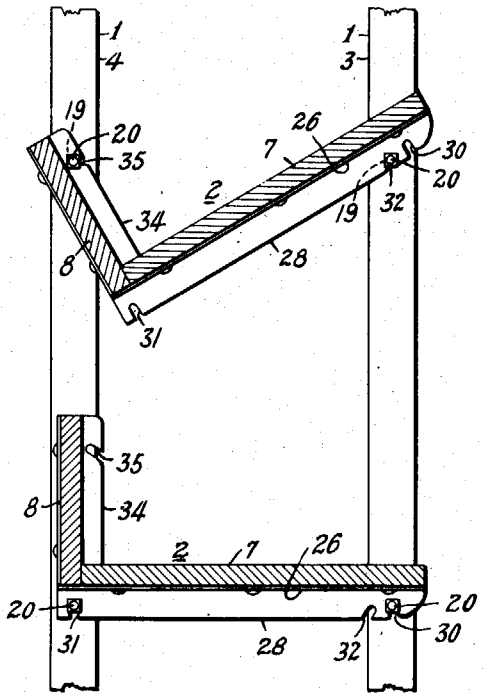

For a fuller understanding of the nature and objects of the invention reference should be had to the following detailed description taken in connection with the accompanying drawings, in which:

Figure 1 represents a front elevation of a rack embodying one form of the invention, Fig. 2 is a vertical section thereof taken on the line 2—2 in Fig. 1, Fig. 3 is a view similar to Fig. 2, but taken on the line 3—3 in Fig. 1, Fig. 4 is an enlarged sectional view through a pair of shelves mounted in position, Fig. 5 is a similar view showing a back extension piece used as a division strip mounted upon a shelf, Fig. 6 is a partial perspective view showing a shelf mounted in position with a back extension about to be mounted on the back portion of the shelf, Fig. 7 is a view similar to that shown in Fig. 4 illustrating a slightly different construction, this view being taken on the line 7—7 of Fig. 8, Fig. 8 is a front elevation of the device as shown in Fig. 7, Fig. 9 is a view similar to Fig. 7, and showing a further form of the invention, this view being taken on the line 9—9 of Fig. 10, and Fig. 10 is a front elevation of the construction shown in Fig. 9.

In the illustrated forms of the invention it will be seen that there are provided a plurality of spaced upright members 1, which serve as standards for the rack and extending between these standards and affixed thereto in a manner hereinafter brought out, are one or more shelves 2, it being noted that each of the members 1 preferably includes front and rear posts 3 and 4 respectively, which may be permanently affixed to each other by cross rods 5 and base portions 6.

Certain of the features of the present invention are to be predicated to the attachment of the shelf or shelves to the standards or upright members in such a manner that the former may be supported as desired, in either horizontal or inclined planes. The construction utilized for effecting this attachment is preferably of such a nature that when the elements of the rack are combined in the manner aforedescribed, a rigid and unitary structure will be provided, and in addition to this feature this attaching means is preferably of such a character that shelves may be carried on both sides of an upright where it is used as an intermediate standard, or on one side only where it is used to form the end of a rack. In this way additional shelves and uprights may be added to extend the rack at any time desired.

If it is found that articles supported by the rack evince a tendency to slip from the shelves of the latter when these elements are arranged in inclined position, this difficulty may be overcome by utilizing any suitable construction which will serve to restrain the movements aforementioned. With this in mind, in the present exemplification each of the shelves 2 comprise a base or bottom 7, to which a back portion 8 may be suitably attached, the latter conveniently extending upwardly from a point adjacent the rear edge of the former, it being further understood that each of the back portions 8 may be conveniently of a height less than the distance from the front to the rear edge of the base 7.

In the present instance a plurality of supporting elements are provided for the purpose of properly retaining each shelf in association with adjacent uprights and a convenient arrangement of such supporting elements is to be found where, for example, three of the same are associated with either the shelf or one of the upright members at a point adjacent that at which the shelf is suported, while a pair of co-operating supporting elements are associated with the other of these rack portions. When so utilized, the three supporting elements may be arranged in a generally triangular formation so that the same may be divided into two groups, one of which is in operative association with the pair of co-operating supporting elements when the shelves are in one position, while the second group of the same are in similar operative association with the aforementioned pair of supporting elements upon the shelves being arranged in their alternative position.

Thus, it will be apparent, assuming that the uprights or standards are each formed with pairs of laterally extending bolt supporting openings corresponding in number to the number of shelves to be supported, and that each of the shelves is formed with three or more slots arranged in properly related groups, the shelves may optionally be supported in one of two positions. Preferably the bolts either extend all the way through the uprights, with threaded portions on both ends, or else separate bolts may be positioned in the uprights to extend from the opposite sides thereof in alignment with each other, it being understood that the bolts are positioned at spaced intervals so that the shelves may be mounted in position relative to the same with a proper vertical distance between the shelves.

In the form of the invention illustrated in Figures 1 to 5, each of the bottom portions 7 of the shelves carries adjacent its end edges pairs of supporting elements in the nature of brackets 9 and 10, it being perceived that these brackets are preferably arranged one adjacent the forward edge of the shelf portion, the other adjacent the rear edge thereof. Reference being particularly had to Figs. 4 and 5, it will be noted that the body of each bracket may specifically embrace a downwardly or vertically extending flange portion 11 formed with a slot 12 in its lower edge and being also provided with a leg or horizontal flange portion 13 adapted to lie flush against the under face of the shelf portion 7 and to be properly affixed thereto, it being of course, understood that the flange portions 11 of the different brackets extend in opposite directions so that these portions come to lie at points in greatest proximity to the edge portions aforementioned.

It will further be noted in the present embodiment, that each back portion 8 is also provided with a pair of brackets 15, one at each end thereof, these brackets each comprising a portion 16, secured to the back 8 of the shelf, and a portion 17 extending forwardly from the back portion and having its lower edge interrupted by an upwardly extending notch 18. Pairs of openings 19 are provided in each of the upright members to receive bolts 20 in position to co-operate with the slots of the brackets 9, 10 and 15. These bolts will be so positioned that when co-operating with one pair or group of brackets as 9 and 10, the shelf will be in horizontal position, and when co-operating with the second group, as 9 and 15, the shelf will incline downwardly to the rear.

To fasten the shelf in a horizontal position the bolts 20 will be inserted in the openings 19, and the brackets 9 and 10 will be slipped over them as shown in Fig. 3, in which position the said bolts will extend within the notches of these brackets. The nuts on the bolts may then be tightened, and the structure will be held rigidly in assembled position. It will be obvious that the rack may be assembled with the shelves inclined by utilizing the brackets 9 and 15 instead of 9 and 10. In any case the shelves and uprights, when fastened together, form a rigid self-supporting structure.

If it is desired to provide a higher back for the shelf this may readily be accomplished by the provision of an extension member 21 which may be removably secured in position upon the upper edge of a back portion 8 of shelf, as has been indicated in Fig. 6. Preferably all of the extension members are provided with downwardly extending dowel pins 22 which are adapted to fit into corresponding openings 23 formed in the upper edge of the back portions of the shelf to thus hold the parts in assembled position.

When it is desired to divide the shelves into compartments or to provide a shelf space of less than the usual depth, this can readily be accomplished by the provision of members 24, which are termed division strips, this construction serving to support containers or articles of a width substantially less than the shelf width. These division strips may be of a construction so similar to that of the back extension members 21 that these elements can be interchangeably used and in order to attach the division strips to the shelves, the bottom portions of the latter may be formed with a series of aligned openings 25 extending parallel to one of the side edges of the shelf so that dowel pins 26 associated with each of the division strips, may be brought to extend into one of the openings aforementioned, in order to detachably secure the strip in position.

In the form of construction illustrated in Figures 7 and 8, angular brackets are provided at each end of the shelf bottom and these brackets may take the form of a metallic member having a bottom flange 26 secured to the under side of the shelf portion 7, and a flange 27 which may form a continuation of flange 26 and be bent at right angles thereto, this latter flange being secured to the rear surface of the back portion 8 of the shelf. Vertical flanges 28 and 29 extend downwardly from the flanges 26 and 27. Each flange 28 is interrupted by slots or notches 30 and 31 formed adjacent its front and rear ends respectively. Flange 28 is provided with a notch 32, somewhat to the rear of notch 30, the former being inclined downwardly, as in Fig. 7, and the flange 29 is also provided with a notch 33 which opens backwardly through the rear and outer edge of this flange.

Each shelf is provided with a pair of the brackets described, these brackets being arranged one adjacent each end and having oppositely disposed bodies so that the flange portions will come to lie in planes substantially in line with the end edges of the shelf and, in such position, the brackets obviously serve to reinforce the shelf and retain the parts of the same against movement relative to each other. If now, the shelf is to be mounted in horizontal position, it will be obvious that the bolts 20 of the uprights or side standards will be brought to extend into the notches 30 and 31 of the flanges 28 as has been shown in the lower portion of Fig. 7, while on the other hand, if the shelf is to be inclined rearward and downward, these bolts, as in the upper portion of the figure last referred to, will extend into the slots 32 and 33 of the flanges 28 and 29 respectively.

In common with the types of construction previously described it is to be noted that in the construction shown in Figs. 7 and 8, certain of the rack members are provided with supporting elements triangularly arranged and subdivided into groups which are optionally associated with a pair of supporting elements in association with a second of the rack members to either support the shelf in horizontal or inclined positions.

Now, referring to the form of construction illustrated in Figs. 9 and 10, it will be seen that similar to the previous forms of construction, side members and shelves are provided and the former have associated with them a series of bolts 20 arranged in pairs and preferably in substantially the same horizontal plane. The shelves, similar to the construction shown in Figs. 4, 7 and 8, include bottom and back portions which may be held in positions at right angles to each other by the use of brackets. Also, in common with the form of construction last described, these brackets have flanges 28 extending downwardly from their bodies 26 and each of these flanges is preferably formed with notches 30, 31 and 32. However, contrary to the construction described in connection with the last mentioned figures, it will be seen that that portion of the bracket body which extends at right angles to the flange 28 has a flange 34 extending towards the forward edge of the shelf and around the side edge of the back thereof. This latter flange is interrupted with a slot or notch 35 and it is thus obvious that when this form of construction is adopted, the shelves similar to the method described in connection with Figs. 7 and 8, may be supported in horizontal positions by having the bodies of the bolts 20 rest within the notches 30 and 31 while, if the shelves are to be supported in an inclined position this result may be reached by shifting the latter so that the bolts are brought to extend into the notches 32 and 35 of the brackets.

It will be noted that the various constructions described provide for the ready removal of shelves or mounting of shelves in desired positions and that the rack may be extended at either end by securing additional shelves on the bolts 20 which extend from the outer surfaces of the end uprights of the rack, these additional shelves being, of course, provided by an additional end upright as has best been shown in Fig. 1.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a display rack, the combination of upright members, securing devices extending from the same at spaced intervals, and shelves adapted to extend between adjacent upright members, having bottom portions and back portions extending upwardly from the rear edges thereof, said shelf back and bottom portions having securing devices thereon adapted to coact with said first named securing devices, to support said shelves in horizontal position or in inclined position from back to rear, as desired.

2. In a display rack, the combination of upright members having bolts extending from both sides of the same at spaced intervals, in the lengthwise direction of the rack, shelves adapted to extend between adjacent upright members, and brackets secured to said shelves having slots therein adapted to fit over said bolts to support said shelves, said bolts having nuts for holding said brackets in position, said brackets being adapted to fit over the portions of said bolts extending from either side of an upright member, so that the rack may be extended at will by the addition of shelves and upright members.

3. In a display rack, the combination of upright members, having front and rear portions, shelves, adapted to extend between adjacent upright members, brackets secured to said shelves and securing devices extending from said upright members, said brackets having upwardly extending slots therein, positioned and adapted to fit over said securing devices to support said shelves in either horizontal position or inclined from front to rear, as desired.

4. In a display rack, the combination of upright members, having front and rear portions, shelves, adapted to extend between adjacent upright members, having bottom portions, and back portions extending upward from the rear edges thereof, brackets secured to said bottom and back portions, and securing devices extending from said upright members, said brackets having openings therein adapted to fit over said securing devices, to support said shelves in horizontal position when openings in said brackets adjacent to said bottom portions engage said securing devices, and to support said shelves in position inclined from front to rear when openings in said brackets adjacent to said bottom and back portions engage said securing devices.

5. In a display rack, the combination of upright members, having front and rear portions, shelves, adapted to extend between adjacent upright members, having bottom portions, and back portions extending upwardly from the rear edges thereof, a bracket member secured to the bottom portion of each shelf, having a downwardly extending flange with slots extending upwardly from its lower edge, adjacent the front and rear ends thereof, and a bracket member secured to the back portion of each shelf, having a slot therein, and bolts extending laterally from said upright members, so positioned that said shelves may be mounted horizontally with forward and rear slots of said first named bracket members positioned on front and rear bolts, or that said shelves may be mounted at a rearwardly extending inclination with forward slots of said first named bracket members and slots of said second named bracket members positioned on front and rear bolts, respectively.

6. In a display rack, the combination of upright members having bolts extending laterally from the same at spaced intervals, shelves adapted to extend between adjacent upright members, said shelves having bottom portions and back portions extending upwardly from the rear edges of said bottom portions, brackets secured to said shelves having openings therein adapted to fit over said bolts to support said shelves in either horizontal position or a position inclined from front to back, and members adapted to be removably secured on the upper edges of said back portions, as back extensions, or to be removably secured on said bottom portions of the shelves, as division strips.

7. In a display rack, the combination of upright members, shelves adapted to extend between adjacent upright members, having bottom portions, and back portions extending upwardly from the rear edges thereof, brackets secured to said shelves adjacent the side edges thereof, having flanges extending from front to rear of the bottom portions and from top to bottom of the back portions, secured to the under and rear surfaces of said bottom and back portions respectively, and flanges extending from the edges of said first named flanges, in vertical planes, said lower vertical flanges having slots extending upwardly from their lower edges adjacent the front and rear ends thereof and said back vertical flanges having slots in the free edges thereof, and bolts extending laterally from said upright members, so positioned that said shelves may be mounted horizontally with forward and rear slots of said lower flanges positioned on front and rear bolts, or that said shelves may be mounted at a rearwardly extending inclination with forward slots of said lower flanges and slots of said back flanges positioned on front and rear bolts, respectively.

8. In a display rack, in combination, a plurality of standards, a shelf, two supporting elements on one of said members and three triangularly-arranged supporting elements on another of said members, a pair of said triangularly-arranged elements cooperating with said two elements to support said shelf in substantially horizontal position, and another pair of said triangularly-arranged elements cooperating with said two elements to support the shelf in an inclined position.

9. In a display rack, in combination, a plurality of standards of constant width, a shelf, a plurality of supporting elements on one of said members, and a plurality of supporting elements on another of said members and cooperating with said first-named elements whereby said shelf may be placed in one position on said standards and be subsequently readily detached therefrom and replaced on said standards at substantially the same point and in a relatively angular position, said elements supporting said shelf in both of said positions.

10. In a display rack, in combination, a plurality of standards of constant width, a shelf, and means to support the shelf on the standards in one of a plurality of positions, said means including a pair of supporting elements on said standards and a plurality of cooperating supporting elements on said shelf, said elements being so positioned on said members that the shelf may be placed in one position on said standards and subsequently freely removed therefrom and replaced on said standards at substantially the same point and in a relatively angular position, said elements supporting said shelf in both of said positions.

11. In a display rack, in combination, a plurality of standards, a shelf, and means to support the shelf on the standards including a plurality of grouped supporting elements on one of said members and a plurality of supporting elements on another of said members, said latter elements cooperating with one of said groups to support the shelf in one position on the standards and cooperating with another of said groups to support the shelf in a relatively angular position.

12. In a display rack, in combination, a plurality of standards, a shelf, both of said members being formed with sets of openings, one of said sets being arranged in triangular formation, bolts extending through certain of the openings and cooperating with a pair of the triangular openings to support the shelf in substantially horizontal position and cooperating with another pair of the triangular openings when supporting the shelf in an inclined position.

13. In a display rack, in combination, a plurality of standards, a shelf carried thereby, means for supporting said shelf in a substantially horizontal position, means for supporting said shelf in an inclined position, and means common to both of said last-named means and acting to support said shelf in either of said positions, said shelf retaining articles for display when in either of said positions, and said means comprising a plurality of supporting elements, each of which is immovably mounted on one of said members.

14. In a display rack, in combination, a plurality of standards, a shelf, means to support said shelf on said standards in a plurality of relatively angular positions, and means for detachably mounting an upwardly-extending member in any one of a plurality of positions on said shelf.

15. In a display rack, in combination, a plurality of standards, a shelf comprising a main shelf-member and back member, means to support the shelf on the standards in a plurality of relatively angular positions, and means for detachably mounting an extension on said back member.

16. In a display rack, in combination, a plurality of standards, a shelf comprising a main shelf-member and a back member, means to support the shelf on the standards in a plurality of relatively angular positions, and means for detachably mounting a division strip on said main shelf member.

17. In a display rack, in combination, a plurality of standards, a shelf comprising a bottom portion and a back portion, means to support the shelf on the standards in a plurality of relatively angular positions, and a member adapted to be detachably mounted as an extension on said back portion or to be detachably mounted as a division strip on said bottom portion.

18. In a display rack, in combination, a plurality of standards, a shelf comprising a bottom portion and a back portion, means to support the shelf on the standards in a plurality of relatively angular positions, and a division strip adapted to be detachably mounted on said bottom portion in a position forward of said back portion.

GEORGE A. TAYLOR.